Figures 1, 3:
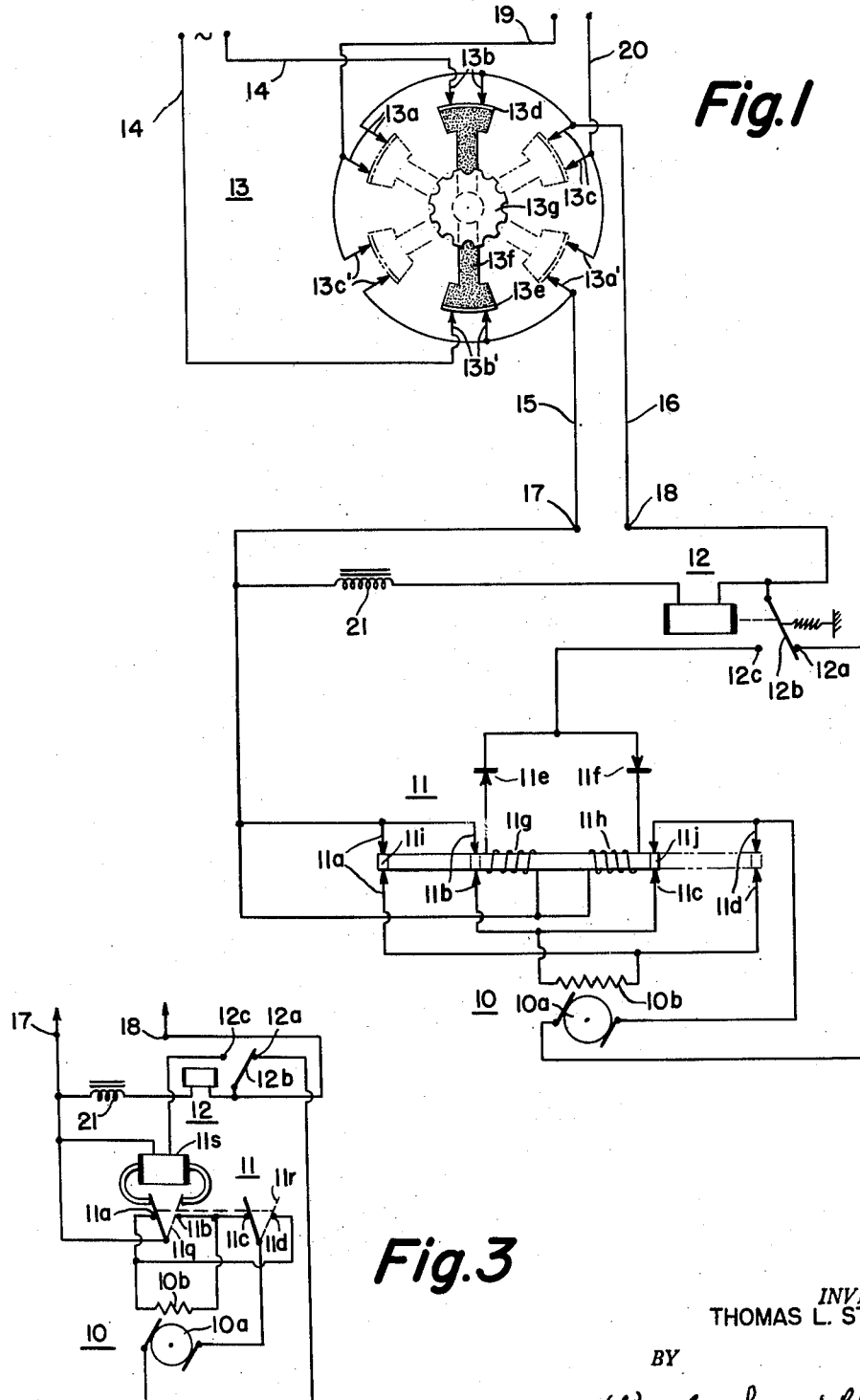

Dec. 16, 1952 T. L. STURGES 2,622,134
REMOTE CONTROL SYSTEM
Filed Aug. 5, 1950 2 SHEETS—SHEET 1

INVENTOR.
THOMAS L. STURGES
BY
Woodcock and Phelan
ATTORNEYS

Dec. 16, 1952 T. L. STURGES 2,622,134
REMOTE CONTROL SYSTEM
Filed Aug. 5, 1950 2 SHEETS—SHEET 2

INVENTOR.
THOMAS L. STURGES
BY
Woodcock and Phelan
ATTORNEYS

Patented Dec. 16, 1952

2,622,134

UNITED STATES PATENT OFFICE 2,622,134

REMOTE CONTROL SYSTEM

Thomas L. Sturges, New York County, N. Y.

Application August 5, 1950, Serial No. 177,793

14 Claims. (Cl. 175—351)

My invention relates to remote control systems for electrical machines and has for an object the provision of a system which is simple and reliable and which requires but a single pair of conductors for supply of power current to a distantly located machine and for the supply over the same pair of conductors of control currents of a different character to effectuate precise control functions at the distantly located electrical machine.

Heretofore various systems have been provided for the remote control of electrical apparatus in which supervisory control signals have been carried by power conductors to remotely located receiving stations. But systems of the foregoing character have in general required special coupling devices both at the transmitting and receiving ends of the power conductors, together with relatively expensive apparatus for generating supervisory signals of a character substantially differing from those normally carried by the power lines.

In carrying out the present invention in one form thereof, a transfer switch at a remote location may be operated from one position to the other as determined by the position of a selector switch in conjunction with the energization of a relay located at said remote station. Such transfer switch functions as a power-controlling contactor for electrical machinery. Further in accordance with the invention, the selector switch is connected between a pair of conductors extending from the control station to the remotely located station. The selector switch may be operated selectively to apply to the pair of conductors direct current of one polarity or the other, or to apply alternating current thereto, to provide for selective response of the transfer switch and the relay to control and power currents.

Further in accordance with the invention, the relay located at the remote station includes an impedance element in circuit with its operating winding to eliminate therefrom alternating current of magnitude adequate to energize the relay, but which impedance is not effective to limit direct current from energization of said relay. In conjunction with said relay, the transfer switch, which is polarized for selective operation depending upon the polarity of the direct current applied thereto, may be utilized at the remote station to change connections as desired, as for example for reversing the direction of rotation of a motor.

The relay is so connected in circuit with the operating winding of the transfer switch that that winding may not be energized except upon application thereto of direct current. The relay also functions to open the circuit to the remotely controlled device, such as the motor, to prevent application thereto of the direct current. Unwanted application to the controlled device of control current is thus prevented.

By reason of the foregoing provisions, positive and effective control of the transfer switch is obtained, and the invention has the further advantage that the system is particularly well suited to applications such as cranes and trains, where the receiving station may move relative to the control station. Thus, in the operation of miniature trains, the driving motor of the locomotive may be reversed at will by operation of the selector switch, momentarily to apply direct current between the two current-carrying rails to operate the transfer switch from one circuit-controlling position to another, as may be desired.

Figure 2:
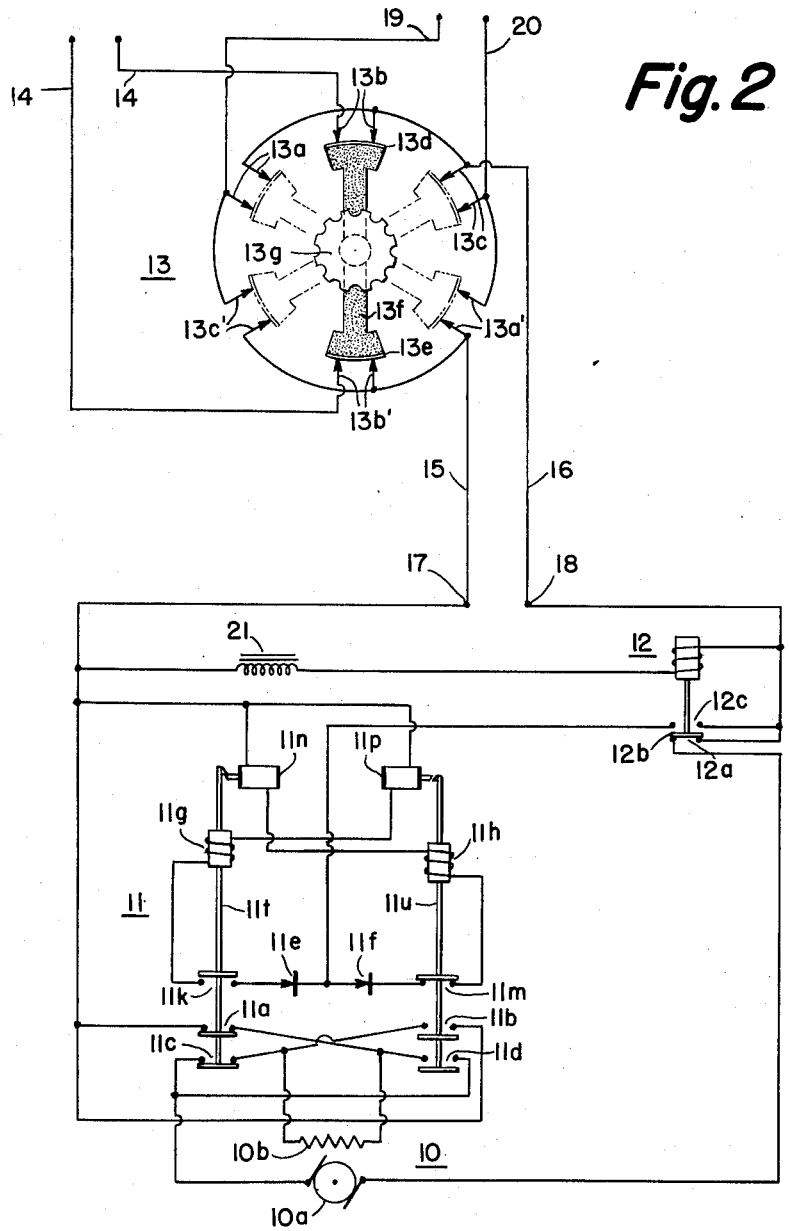
Figure 4:
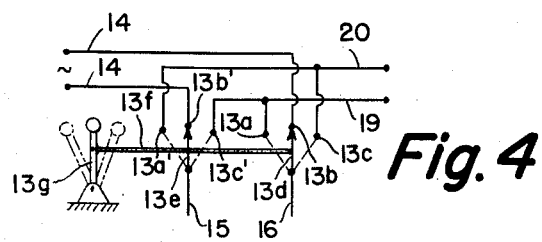

For further objects and advantages of the invention, reference is to be had to the following detailed description taken in conjunction with the accompanying drawings, in which:

Fig. 1 diagrammatically illustrates a wiring diagram of a preferred embodiment of the invention;

Fig. 2 diagrammatically illustrates a modification of the invention;

Fig. 3 is a fractional wiring diagram of a further modification of the invention; and Fig. 4 diagrammatically illustrates a modification of the selector switch which may be utilized at the control station.

Referring to the drawings, the invention in one form has been shown as applied to the control of a motor 10 illustrated as of the series type and including an armature 10a and a series field winding 10b which may be reversed at will by operation of a contactor such as a change-over switch or a transfer switch 11 under the control of a relay 12 and a selector switch 13. The motor 10 may be utilized for driving cranes or miniature trains or for other purposes where it is desired to control the motor at a distant location from a control station.

Though any suitable type of selector switch may be utilized, the one illustrated in Fig. 1 is of the rotary type in which the ends of opposite spokes or the ends of a diametrically extending member 13f of insulating material has secured thereto conductive segments 13d and 13e. The diametral member 13f is shown in a position completing circuits through stationary contacts 13b and 13b' and when rotated in one direction or the other will complete circuits respectively through stationary contacts 13a, 13a' and through stationary contacts 13c, 13c'. With the selector switch and the other parts in the positions shown in Fig. 1, the motor 10 will be energized through a circuit which may be traced as from the lefthand supply line 14 through contacts 13b' and 13e, conductor 15, terminal 17, contacts 11a and 11i of the transfer switch 11, field winding 10b, the contacts 11c and 11j, motor armature 10a, relay contacts 12a and 12b, terminal 18, conductor 16 and by way of selector contacts 13d and 13b to the other supply line 14. Thus, the motor is energized for rotation in one direction, as for example, driving a locomotive of a miniature train forwardly along a track.

For the purposes of brevity and clarity, the movable contacts 13d and 13e of selector switch 13 will not be recited for each switch connection. Reference to the stationary contacts alone, being shorted by movable contacts 13d and 13e in any described position, will describe the connecting action of selector switch 13.

For the train application, it will be frequently desirable to reverse the motor with the train at any location in a network of tracks. In accordance with the invention, the reversal of the motor will be achieved by using a handle or knob to rotate the selector switch 13 to interrupt the circuit by way of contacts 13b—13b' and to complete a control circuit to conductors 15 and 16 by way of stationary contacts 13c—13c' from supply conductors 19 and 20 connected to a source of direct current. It will be observed that the control circuit for the operating coil of the relay 12 may be traced by way of supply line 20, stationary contacts 13c, conductor 16, terminal 18, operating coil of relay 12, impedance 21 which is characterized by its high reactance to alternating current and its low impedance and low ohmic resistance to direct current, and by way of terminal 17, conductor 15 and stationary contacts 13c' to the other direct-current supply line 19. The relay 12 is immediately energized to interrupt the motor circuit through contacts 12a and 12b and to complete a circuit through contact 12c for an actuating coil 11h of the operating winding of the transfer switch 11.

In Fig. 1, coil 11h is in circuit with a unidirectional conductive device 11f. At this point it may be emphaszed that the selective operation of the transfer switch 11 is made dependent not only upon actuation of relay 12, but also upon the polarity of the direct current applied to the single pair of conductors 15 and 16 by inclusion in the control circuits of the unidirectional conductive devices 11e and 11f which may comprise copper-oxide rectifiers. Thus, the energizing circuit for an actuating coil 11h of transfer switch 11 may be traced from supply line 20 by way of stationary contacts 13c, conductor 16, terminal 18, relay contact 12b and control contact 12c, unidirectional conductive device 11f, actuating coil 11h, terminal 17, conductor 15 and by way of stationary contacts 13c' to the other direct-current supply line 19. The actuating coil 11h is immediately energized to operate the armature or core of transfer switch 11 to move segment 11i between contacts 11b and to move segment 11j between contacts 11d. Accordingly, the power circuit for the field winding 10b of motor 10 is reversed by the foregoing operation of the transfer switch 11 preparatory to completion of the power circuit from alternating-current supply conductors 14. Power is applied to motor 10 for reverse operation by returning the transfer switch 13 to the position shown in Fig. 1. Upon interrupting the circuit from direct-current lines 19 and 20, the relay 12 is immediately deenergized, the contact 12b completing a circuit through stationary contact 12a. Thus, as the selector switch is returned to the illustrated position, power flows through the previously traced circuit and by way of terminal 17 through stationary contacts 11b now bridged by segment 11i, field winding 10b in a direction opposite to that previously traced, thence by way of stationary contacts 11d now bridged by segment 11j, and by way of the relay contacts and terminal 18 to the other source of supply. It is to be observed the armature 10a of motor 10 is energized from the same circuit, but the direction of current therethrough is the same as before. In this manner the motor is energized for reverse operation to reverse the movement of the train or to produce the desired control action at the remote station.

At any time it is desired again to reverse the operation of motor 10, as by actuation of the transfer switch 11 to the full-line position shown in Fig. 1, it is only necessary to rotate the selector switch 13 in a counterclockwise direction to complete circuits through stationary contacts 13a and 13a'. As before, the relay 12 is immediately energized by application of direct current to interrupt the circuit through power contact 12a and to complete a circuit through stationary control contact 12c which, by reason of the reversed polarity of the unidirectional current from lines 19 and 20, is effective through the unidirectional conductive device 11e to energize actuating coil 11g to return the transfer switch 11 from the broken-line position shown in Fig. 1 to the full-line position thereof. Return of the selector switch 13 to the power position shown in Fig. 1 interrupts the energizing circuit for relay 12 and completes the power circuit for rotation of motor 10 in the forward direction.

While a preferred embodiment of the invention has been described, it is to be understood that modifications may be made within the scope of the appended claims as by way of additions such as a line switch and circuit in either or both of supply lines 14 and direct-current lines 19 and 20 and by way of substitute or equivalent devices which introduce added functions into the operation.

For example, in Fig. 2 the transfer switch 11 has been illustrated as comprising a pair of circuit controllers 11t and 11u of the latched-in type. As will be explained in detail, they have the advantage of preventing energization of the actuating coil when the selector switch is moved to a position for actuation of one of the latched-in circuit controllers or contactors which has already been moved to an energized position. Thus, the selector switch can then be used for an on-and-off switch without continued energization of an actuating coil of the transfer switch. The use of latched-in contactors also has the advantage of being readily available on the market at reasonably low cost and of assuring freedom from adverse effects due to shock and the like.

Referring now more particularly to Fig. 2, it will be observed that the operating coil 11g is connected in circuit with contacts 11k of its associated contactor 11t, operating coil 11h being similarly connected with respect to contacts 11m of its associated contactor 11u. Thus, as one contactor releases the other as by energization of trip coil 11n or 11p, the control circuit is partially completed, but after one of the contactors has been moved to a latched-in position, the control circuit is open.

In Fig. 2 the power circuit through the selector switch 13 is the same as in Fig. 1, but from terminal 17 is traced through power contacts 11a of contactor 11t by way of motor field coil 10b, power contacts 11c of contactor 11t, motor armature 10a, and by way of relay power contacts 12a to the other terminal 18. It is to be observed that contacts 11k are in open-circuit position, the contactor 11t being held in its latched-in position by the latch actuated by the releasing coil 11n. Accordingly, if selector switch 13 be rotated in a counterclockwise direction to complete circuits through stationary contacts 13a, 13a', the relay 12 will be energized by flow of unidirectional current through impedance 21, but the operating coil 11g will not be energized since that circuit including tripping coil 11p and actuating coil 11g is open by reason of the open-circuit condition of control contacts 11k. Thus, the selector switch 13 can be operated between its illustrated position and its first counterclockwise position as an on-and-off switch for the motor 10.

In order to reverse the operation of the motor 10, it is only necessary to operate the switch 13 in a clockwise direction to complete circuits through stationary contacts 13c and 13c', the result of which is to energize the relay 12 and to complete an energizing circuit as from terminal 18 by way of relay control contacts 12c, unidirectional device 11f, interlock control contact 11m, operating coil 11h, and by way of trip coil 11n to the other terminal 17. Thus, the latched-in contactor 11t will be tripped to open the circuit through its power contacts 11a and 11c and to complete a control circuit through interlock control contacts 11k preparatory to a subsequent reversing operation. At the same time the contactor 11u will be energized partially to complete power circuits for the motor 10 which include the reversal of current flow through the field winding 10b. The power circuit is, of course, completed by return of the selector switch 13 to the illustrated position at which time the motor 10 is energized for reverse operation. When contactor 11u is moved to its latched-in position, it will be observed the energizing circuit for its actuating coil 11h and for the tripping coil 11n is interrupted through interlock control contacts 11m. Hence, the selector switch 13 may be used as an on-and-off control switch when rotated between the illustrated power position and the control position bridging contacts 13c and 13c'.

Instead of transfer switches of the type illustrated in Figs. 1 and 2, a transfer switch of a somewhat simpler design may be utilized as illustrated in the modification of Fig. 3 and which comprises magnetic structure of the polarized type. As shown in Fig. 3, such a transfer switch 11 has been illustrated as connected to terminals 17 and 18, the remainder of the control circuit being the same as in Fig. 2 and being omitted in Fig. 3. As shown, power may flow as, for example, from terminal 17 through stationary contact 11a, field coil 10b, contact 11c and by way of motor armature 10a, and relay contacts 12a and 12b to the other terminal 18. Since the magnetic structure of transfer switch 11 of Fig. 3 is polarized, application to terminals 17 and 18 of unidirectional current of one polarity will not cause movement of the movable contacts 11q and 11r, but application of unidirectional current of reversed polarity will cause such contacts to move to their illustrated broken-line positions, thereby reversing the connections to motor field winding 10b to reverse the motor. The relay 12 functions as before in response to the application of unidirectional current to interrupt the power circuit and to complete the control circuit to the operating winding 11s of polarized transfer switch 11.

It is to be understood that several electrical switches can be utilized to complete circuits to the pair of conductors 15 and 16 and that the selector switches may differ in construction so long as they perform the circuit-controlling functions which have already been set forth in detail. For example, the selector switch may be constructed as illustrated in Fig. 4, the switch handle 13g having three positions a, b and c, respectively corresponding with movable contact 13d in engagement with stationary contact 13a, 13b or 13c. More particularly, if the knob or operating arm 13g of selector switch 13 of Fig. 4 be rotated from position a to position b, movable contacts 13d and 13e engage stationary contacts 13b and 13b' to complete a circuit from alternating-current supply lines 14 to conductors 15 and 16 and to already described power circuits in a remote station or in a number of such remote stations.

Reversal of connections to the motor can be made by moving handle 13g from position b to position c, whereupon control voltage of a polarity opposite to that applied when the switch was in position a will be applied to conductors 15 and 16. As already described, the application of this control voltage of reversed polarity actuated the relay and transfer switch of a remote station to change power connections for reverse operation of a power-consuming device. Subsequent movement of knob 13g to position a applies the control voltage of the other polarity and will thereby actuate the relay and transfer switch of the remote station to return power connections to the original operating position.

What is claimed is:

1. A control system comprising a transfer switch having selectively positioned power contacts determining the sense of power applied through them and actuating means, a relay having control contact structure operable to a position in circuit with the actuating means of said transfer switch and having power contact structure operable to a position in circuit with the power contacts of said transfer switch, a selector switch having at least two control positions and a power position and connected to the operating coil of said relay, means including interconnection between the control contact structure of said relay and the actuating means of said transfer switch controlled by movement of said selector switch to a control position for selective positioning of the power contacts of said transfer switch, and means including interconnection between the power contacts controlled by movement of the selector switch to power position and those of said transfer switch for application of power in the sense preset by the prior selected control position of the selector switch.

2. A control system for electrical power comprising a three-position selector switch, a two-position relay, a single pair of conductors extending between said selector switch and said relay, said selector switch in a first position applying to said conductors electrical energy of one character, in a second position applying power energy to said conductors and in a third position applying electrical energy of a different character to said conductors, a transfer switch at said relay location operable between forward and reverse positions, an operating winding for said transfer switch, said relay in its deenergized position completing a power circuit through said transfer switch and between said two conductors, circuit connections to said pair of conductors from the operating winding of said transfer switch completed by energization of said relay for operating said transfer means, and means included in circuit with the operating winding of said transfer means for producing selective operation thereof upon movement of said three-position selector switch to said first or to said third positions thereof to effect selected operation of said transfer means by the character of the control energy applied to said pair of conductors.

3. A control system comprising a transfer switch at a remote location having contacts operable between one circuit-controlling position and another circuit-controlling position, actuator means for said switch responsive to the character of control energy supplied thereto for selective control of the operation of said transfer switch, a relay having a contact which in one position of the relay completes a power circuit to said contacts of said transfer switch and having a contact which for a second position of said relay completes a control circuit for said actuator means, a pair of conductors extending from said remote location to a control station, said relay having an operating coil connected to said conductors, means in circuit with said coil for preventing actuation of said coil by power energy and offering low impedance to flow of control energy to energize said relay to connect said actuator means to said conductors for operation of said transfer switch to a selected circuit-controlling position, a selector switch at said control station in one position controlling the application of electrical power energy by way of said conductors and said relay to the contacts of said transfer switch, said selector switch in a second position applying electrical control power of a distinctively differing character to said conductors, said selector switch having a third position for applying control power of a still differing character for energizing said relay and said actuator means to operate said transfer switch to its other circuit-controlling position.

4. A control system for an electrical machine comprising a three-position selector switch connected to power-voltage supply lines and to control-voltage supply lines, a two-position relay, an impedance element in circuit with said relay limiting the response of said relay to control energy, a single pair of conductors connecting said selector switch to said relay and impedance element in series connection, a transfer switch connected to said conductors and selectively responsive to control voltages and having an actuating circuit completed upon energization of said relay, said relay in its deenergized position completing a power circuit to the contacts of said transfer switch and to the electrical machine.

5. A control system for an electrical machine comprising a single pair of conductors between a control station and a remote station, switching means for selectively impressing a control voltage and a power voltage of different characteristics upon said conductors, a relay connected to said conductors and including means for precluding relay response to power voltage, said relay having control contacts and power contacts for alternate connection to the first of said conductors, a contactor having a control circuit in circuit with the control contacts of said relay and having power contacts in circuit with the power contacts of said relay and having a common connection to the second of said conductors, said contactor including circuit connecting means whereby an operating condition for the electrical machine is selected and power applied thereto, and polarized conductive means providing for selective response of said contactor to control voltages as impressed by said switching means.

6. A control system for electrical power comprising a two-pole, three-position selector switch having power contacts and control contacts for connection to power-voltage supply lines and to control-voltage supply lines; a single-pole, two-position relay in circuit with said selector switch and having a power contact and a control contact for connection in circuit with the first pole of said selector switch; means in circuit with said relay for precluding response thereof to power-voltage; a contactor in circuit with the second pole of said selector switch and having actuating means and power contacts, said control contacts being in circuit with said control contact of said relay with said relay in one position and said power contacts being in circuit with said power contact of said relay and with a power-consuming device with said relay in a second position; and polarized means for selective response of said contactor to control voltages of differing characteristics; said contactor being governed in its position by the combined action of said selector switch and said relay, and having circuit-connecting means whereby power is removed, either of alternate operating conditions selected, and power reapplied as determined by the positioning of said selector switch.

7. A control system for an electrical machine comprising a two-pole, three-position selector switch connected to power-voltage lines and to control-voltage lines, a single pair of conductors connected to the polar contacts of said selector switch, an impedance element connected to the first of said conductors and having a high reactance to power-voltage, a relay connected to the second of said conductors and to said impedance element, a first contact connected to the second of said conductors by said relay when energized, a second contact connected to the second of said conductors when said relay is deenergized, said second contact connecting to the electrical machine, a transfer switch having a plurality of actuators and a plurality of contacts connected to the first of said conductors, said actuators connected to said first relay contact for control actuation and said transfer-switch contacts being connected to said electrical machine for power and adapted to reverse connections thereto and to open actuator circuits after actuation, means in circuit with each of said actuators for latching it in position when actuated and for releasing the other of said actuators, and unidirectional conductors in circuit with said actuators for selective actuation thereof.

8. A control system for an electrical machine comprising a three-position, two-pole selector switch connected to alternating-current supply lines and to direct-current supply lines, a single pair of conductors connected to the two poles of said selector switch, said supply lines being connected to the three positions of each pole in an arrangement providing one type of control voltage in the first position, power voltage in the second position, and a second type of control voltage in the third position to said pair of conductors; a two-position relay having an operating coil and contact circuits, said operating coil and contact circuits having a common connection to the first of said conductors and the first of said contact circuits connecting to said electrical machine when said relay is in the deenergized position; an impedance element connected to the second of said conductors and in circuit with the relay operating coil and limiting the response of said relay to control energy; a contactor having a plurality of power contacts and control contacts and actuators therefor, said actuators being in circuit with means for latching an energized actuator in energized position and for releasing the other actuator and with unidirectional conductors in opposite polarities for selective operation of said actuators and with said control contacts for breaking the control circuit through each actuator immediately after energization thereof, said latch-releasing means being commonly connected to the second of said conductors, said unidirectional conductors being commonly connected to the second of said relay contact circuits, and said power contacts being in circuit with said conductors and said electrical machine so as to control the operating condition of said electrical machine upon energization of said actuators.

9. A control system comprising a two-pole, three-position selector switch connected to supply lines for power voltage and to other supply lines for control voltage and having a pair of contacts common to all three positions thereof and having other contacts arranged at said three positions for connecting said supply lines to said common contacts so as to provide control voltage of one characteristic in the first position, power voltage in the second position, and control voltage of a second characteristic in the third position; a pair of conductors connected to said pair of common contacts; a relay having an operating coil connected to a first of said conductors and having contacts connected to said first conductor, the first of said relay contacts being closed when the relay is energized and open when it is deenergized, the second of said relay contacts being open when the relay is energized and closed when it is deenergized, an impedance element connected to the second of said conductors and to said relay coil and presenting a high value of reactance to said power voltage, whereby said relay is operable only by control voltages; a transfer switch responsive to the combined action of said relay and of said selector switch and having a plurality of contacts and circuit connecting means for reversing the connection of a load circuit between said power voltage supply lines, a plurality of actuators for closing said plurality of contacts, means for latching said actuators in closed position, means in circuit with each of said actuators adapted to release said latching means of the other actuator, said releasing means being commonly connected to the second of said conductors, and means in circuit with each of said actuators for opening its control circuit; and a plurality of unidirectionally conductive elements commonly connected to said first contacts of said relay and further connected one to each actuator circuit in opposed polarity so as to provide for selective energization of said actuators in response to changes in the characteristics of the control voltages provided by said selector switch.

10. In an alternating-current power system, a direct-current system for remote control comprising a single pair of conductors extending from a control station to a distant station, a selector switch at the control station for applying direct current of either polarity or alternating current to said conductors, a direct-current responsive relay at said distant station in circuit with said conductors and including power contacts and control contacts and actuated by said selector switch, and a contactor in circuit with said relay contacts and with said conductors at said distant station and governed in its position by said selector switch and said relay and energized only when direct current is selected, whereby one of a plurality of operating conditions is selected for said alternating-current power system as determined by the polarity of the applied direct-current.

11. A remote control system comprising a pair of conductors extending between a control station and a distant station, a power-consuming device at said distant station, means including a transfer switch having an operating winding and contacts for varying the connections to said device, a relay having an operating coil, said relay in one position completing a circuit from said device to said conductors and in a second position completing a circuit from said conductors to the operating winding of said transfer switch, means in circuit with the coil of said relay for limiting alternating-current flow therethrough below the pickup value of said relay, said impedance having low ohmic resistance for flow of direct current therethrough for operating said relay from one to the other of its positions, a selector switch at said control station operable in a first position for applying alternating current to said pair of conductors, said selector switch having second and third positions for application to said pair of conductors of direct current of selected alternate polarities, said relay upon application of direct current interrupting said circuit to said device and completing a direct-current circuit to said operating winding of said transfer switch for operating the same from one circuit-controlling position to another, return of said selector switch to said first position returning said relay to its first position and applying to said conductors alternating current for flow to said device through said different circuit connections, said selector switch in said third position applying direct current of opposite polarity to said pair of conductors again to energize said relay and to operate said transfer switch again to change said circuit connections to said device for application thereto of said alternating current upon return of said selector switch to its said first position.

12. In a control system, a pair of conductors from a control station to a remote station, a relay connected to said conductors and responsive only to control voltages, a transfer switch having actuating means and circuit-controlling contacts connected to said conductors, said actuating means including polarized conductive means for selective response to different control voltages and said circuit-controlling contacts being operable by said actuating means from one circuit-controlling position to another circuit-controlling position, and contacts in circuit between said conductors and said transfer switch and operable by said relay, said contacts in one position of said relay completing a power circuit to the circuit-controlling contacts of said transfer switch and in a second position completing a control circuit to the actuating means of said transfer switch, whereby a circuit-controlling position is selected upon application of a control voltage to said pair of conductors and a power circuit is completed upon application of power voltage to said pair of conductors.

13. A remote control system for electrical power comprising a contactor having actuators, power contacts, and control contacts in circuit with said actuators; a relay including a power contact and a control contact and operable to one position to connect its power contact in circuit with the power contacts of said contactor and operable to a second position to connect its control contact in circuit with the control contacts of said contactor, and an operating coil, an electrical device in circuit with said coil for making it respond only to control energy; switching means connected to the operating coil of said relay and connected in circuit with the control contacts of said relay and of said contactor for selectively impressing control voltages of differing characteristics and power voltage on said relay and said contactor; and polarized means in circuit with said actuators and providing for selective response of said contactor to control voltages of differing characteristics.

14. In a control system for an electrical power-consuming device, a remotely controlled station comprising a polarized relay having contacts operable from one circuit-controlling position to another circuit-controlling position and having actuator means responsive to the character of control energy supplied thereto for selective control of said contacts, a second relay having a contact which in one position of the second relay completes a power circuit through the power-consuming device to the contacts of said polarized relay and having a contact which in a second position of the second relay completes a control circuit for the actuator means of said polarized relay, a pair of conductors extending from the remote station to a control station, said second relay having an operating coil connected to said conductors, and means in circuit with said operating coil preventing actuation of said second relay by power energy and offering low impedance to flow of control energy to energize said second relay to connect said actuator means to said conductors for operation of said polarized relay to a selected circuit-controlling position.

THOMAS L. STURGES.

REFERENCES CITED

The following references are of record in the file of this patent:

UNITED STATES PATENTS

| Number | Name | Date |
|---|---|---|
| 1,140,545 | Townsend | May 25, 1925 |
| 1,873,579 | Haas | Aug. 23, 1932 |
| 2,018,818 | Thompson | Aug. 29, 1935 |
| 2,250,214 | Ashworth | July 22, 1941 |
| 2,365,641 | Jerome | Dec. 19, 1944 |
| 2,495,791 | Van Daele | Jan. 31, 1950 |